US010153552B2

(12) United States Patent
Ikeda et al.

(10) Patent No.: US 10,153,552 B2
(45) Date of Patent: Dec. 11, 2018

(54) ANTENNA AND ELECTRONIC APPARATUS

(71) Applicant: Seiko Epson Corporation, Shinjuku-ku (JP)

(72) Inventors: Masayuki Ikeda, Nagano (JP); Tadashi Aizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 747 days.

(21) Appl. No.: 14/500,827

(22) Filed: Sep. 29, 2014

(65) Prior Publication Data

US 2015/0091758 A1 Apr. 2, 2015

(30) Foreign Application Priority Data

Oct. 1, 2013 (JP) ................................ 2013-206160

(51) Int. Cl.
*H01Q 7/00* (2006.01)
*G01S 5/02* (2010.01)
*H01Q 1/27* (2006.01)
*H01Q 9/16* (2006.01)
*H01Q 9/30* (2006.01)

(52) U.S. Cl.
CPC ................ *H01Q 7/00* (2013.01); *G01S 5/02* (2013.01); *H01Q 1/273* (2013.01); *H01Q 9/16* (2013.01); *H01Q 9/30* (2013.01)

(58) Field of Classification Search
CPC ........... H01Q 7/00; H01Q 21/26; H01Q 21/29
See application file for complete search history.

(56) References Cited

U.S. PATENT DOCUMENTS 2,297,427 A * 9/1942 Neidhardt .............. H01Q 21/29 343/726
2,953,782 A * 9/1960 Byatt ........................ G01S 1/02 342/428
3,576,567 A * 4/1971 Shively .................. H01Q 21/29 343/704
5,751,252 A * 5/1998 Phillips .................... H01Q 7/00 343/726
5,768,217 A * 6/1998 Sonoda ................ G04B 47/025 343/718
5,838,283 A 11/1998 Nakano
5,945,959 A * 8/1999 Tanidokoro .............. H01Q 1/38 343/700 MS (Continued)

FOREIGN PATENT DOCUMENTS

EP 2 034 555 A1 3/2009
EP 2034555 A1 * 3/2009 ............. H01Q 1/243

(Continued)

OTHER PUBLICATIONS

Nakano, H., et al., "Axial ratio of a curl antenna," IEE Proc.-Microw. Antennas Propag., vol. 144, No. 6, Dec. 1997.
Nakano, H., et al., "A Curl Antenna," IEEE Transactions on Antennas and Propagation, vol. 41, No. 11, Nov. 1993.
Extended European search report, dated Feb. 25, 2015, of the corresponding European Application No. 14186601.2; 6 pgs.

*Primary Examiner* — Gregory C. Issing
(74) *Attorney, Agent, or Firm* — Kilpatrick Townsend & Stockton LLP

(57) ABSTRACT

An antenna includes a magnetic current element which is an element to constitute a loop and generates a magnetic current vector having a component perpendicular to a loop plane, and an electric current element to generate an electric current vector having a component parallel to the magnetic current vector.

19 Claims, 13 Drawing Sheets

(56) References Cited

U.S. PATENT DOCUMENTS

| | | | | |
|---|---|---|---|---|
| 6,437,750 | B1 * | 8/2002 | Grimes | H01Q 7/00 343/726 |
| 6,717,548 | B2 * | 4/2004 | Chen | H01Q 1/42 343/700 MS |
| 6,960,984 | B1 | 11/2005 | Vicci et al. | |
| 7,209,089 | B2 * | 4/2007 | Schantz | H01Q 13/10 343/787 |
| 7,215,292 | B2 * | 5/2007 | McLean | H01Q 7/00 343/725 |
| 7,969,372 | B2 * | 6/2011 | Miyashita | H01Q 1/243 343/742 |
| 8,326,249 | B2 * | 12/2012 | Cezanne | H01Q 1/24 455/269 |
| 2001/0000960 | A1 | 5/2001 | Dettloff | |
| 2009/0195472 | A1 * | 8/2009 | Rambeau | H01Q 7/00 343/829 |
| 2009/0315792 | A1 | 12/2009 | Miyashita et al. | |
| 2011/0102274 | A1 * | 5/2011 | Fujisawa | G04G 5/002 343/702 |
| 2011/0195661 | A1 | 8/2011 | Miyashita | |

FOREIGN PATENT DOCUMENTS

| | | | |
|---|---|---|---|
| EP | 2 051 328 | A1 | 4/2009 |
| EP | 2 226 895 | A2 | 9/2010 |
| EP | 2 226 895 | A3 | 12/2010 |
| JP | 59-012601 | A | 1/1984 |
| JP | S59-012601 | A | 1/1984 |
| JP | 08-17289 | A | 1/1996 |
| JP | 08-195617 | A | 7/1996 |
| JP | 09-247006 | A | 9/1997 |
| JP | H09-247006 | A | 9/1997 |
| JP | 10-075114 | A | 3/1998 |
| JP | 10-327012 | A | 12/1998 |
| JP | 2008-054080 | A | 3/2008 |
| WO | 01/43255 | A1 | 6/2001 |
| WO | 2013/132715 | A1 | 9/2013 |

* cited by examiner

ANTENNA AND ELECTRONIC APPARATUS

CROSS REFERENCES TO RELATED APPLICATIONS

This application claims priority to Japanese Patent Application No. 2013-206160 filed on Oct. 1, 2013, the entirety of which is hereby incorporated by reference.

BACKGROUND

1. Technical Field

The present invention relates to an antenna and an electronic apparatus including the antenna, and particularly to a mobile or portable electronic apparatus.

2. Related Art

For example, in a satellite mobile phone or a navigation apparatus using GPS (Global Positioning System), wireless communication using a circularly polarized wave is performed. Although the circularly polarized wave can be received by a linearly polarized wave antenna, since the gain is halved, it is preferable to use a circularly polarized wave antenna. Besides, in an apparatus, such as a GPS equipment, which is mounted on a person or an animal and is used, it is difficult to always keep the maximum sensibility direction of the antenna in the direction toward the satellite. Thus, an antenna is desirable which is small and has a wide directivity, particularly a wide directivity while a specified circularly polarized wave characteristic is ensured. As an antenna to generate a circularly polarized wave, for example, there is a patch antenna mounted with a perturbation element of JP-A-2008-54080 (Patent Literature 1), a spiral antenna of JP-A-10-075114 (Patent Literature 2), or a curl antenna of a combination of a linear element and a curl element (JP-B-8-17289 (Patent Literature 3), H. Nakano et al "Axial ratio of a curl antenna" IEE Proc. Microw Antennas Propag., Vol. 144, No. 6, December 1997 (Non Patent Literature 1), H. Nakano et al "A Curl Antenna" IEEE TRANSACTIONS ON ANTENNAS AND PROPAGATION, VOL. 41, NO. 11, November 1, (Non Patent Literature 2)).

The patch antenna has defects that as the operation frequency becomes high, the perturbation element becomes small, and the manufacture becomes difficult, and further, the frequency band in which the required circularly polarized wave can be generated is very narrow. Besides, the directivity is single in the patch surface direction, and the beam characteristic becomes relatively narrow. When the ground electrode is made small, the so-called figure-eight directivity is obtained in which the beam is emitted also in the direction opposite to the patch surface (direction toward the ground electrode). However, the rotation direction of the circularly polarized wave to be transmitted and received is reversed between the patch surface direction and the ground electrode direction. Thus, in the patch antenna, it is difficult to obtain the wide directional pattern of the circularly polarized wave. Further, since the patch antenna uses a dielectric body, the loss of the dielectric body cannot be avoided. Even if the dielectric body with the lowest loss is used, the obtained radiation efficiency is about 30%.

Since the spiral antenna or the curl antenna is a travelling-wave type antenna, the antenna is generally large, and although the band is wide, the directivity is sharp, and application to a portable equipment is difficult.

In general, an antenna suitable for a portable equipment using a circularly polarized wave, such as GPS, is required to have the following performances.

1. The directivity is wide, and the circularly polarized wave having a low axial ratio over a wide spatial range can be transmitted and received.

2. The band is wide, and an extremely high component size accuracy is not required.

3. The size is small and the weight is light in order to enable mounting on a portable equipment.

4. The efficiency is high and the sensitivity is high.

Hitherto, there is no antenna satisfying all these requests.

SUMMARY

An advantage of some aspects of the invention is to provide a circularly polarized wave antenna which is small and has a wide circularly polarized wave directivity, a wide frequency band and a high radiation efficiency, a communication apparatus using this, and an electronic apparatus.

The invention can be implemented as the following forms or application examples.

Application Example 1

This application example of the invention is directed to an antenna including a magnetic current element which is an element to constitute a loop and generates a magnetic current vector having a component perpendicular to a loop plane, and an electric current element to generate an electric current vector having a component parallel to the magnetic current vector.

According to this application example, a circularly polarized wave can be generated by combination of an electromagnetic field radiated by the magnetic current element and an electromagnetic field radiated by the electric current element. The radiated electromagnetic field from the magnetic current element has no directivity (doughnut type without a hole, that is, omnidirectional) in the plane perpendicular to the magnetic current vector generated by the magnetic current element. Besides, the radiated electromagnetic field from the electric current element has no directivity (doughnut type without a hole, that is, omnidirectional) in the plane perpendicular to the electric current vector generated by the electric current element. When arrangement is made so that both the vectors become parallel to each other, the directivity characteristics of the electromagnetic fields radiated from both coincide with each other, and the electromagnetic field direction and phase difference is 90°. Accordingly, the circularly polarized wave antenna having no directivity and having wide frequency band can be realized without requiring a unit such as a phase shifter.

Application Example 2

This application example is directed to the antenna of the application example described above, wherein a sum of electric lengths of conductors constituting the magnetic current element and the electric current element is half or less of a wavelength of a driving electromagnetic wave.

According to this application example, since the sum of the electric lengths of the magnetic current element and the electric current element is half or less of the operation wavelength, miniaturization is possible.

Application Example 3

This application example is directed to the antenna of the application example described above, wherein the magnetic current element includes a loop element having a gap, the electric current element includes a first linear element is placed on one surface of the loop plane and a second linear element is placed on the other surface of the loop plane, one end of the first linear element is connected to one end of the loop element, and one end of the second linear element is connected to the other end different from the one end of the loop element.

According to this application example, since the magnetic current element and the electric current element can be constructed of the first linear element and the second linear element, the small and highly efficient antenna can be realized without using a dielectric body which is expensive and has loss.

Application Example 4

This application example is directed to the antenna of the application example described above, wherein the magnetic current element includes a first loop element having a gap and a second loop element having a gap, loop planes of the respective loop elements are arranged to face each other, the electric current element includes a straight-line-shaped linear element, one end of the linear element is connected to the first loop element, the other end different from the one end of the linear element is connected to the second loop element.

According to this application example, since the magnetic current element and the electric current element can be constructed of the straight-line-shaped linear element, the small and highly efficient antenna can be realized without using a dielectric body which is expensive and has loss. Further, since the two magnetic current elements constructed of the loops are provided, further miniaturization is possible.

Application Example 5

This application example is directed to the antenna of the application example described above, which further includes a conductor plate facing the loop plane of the magnetic current element, the magnetic current element has a gap, one end of the electric current element is connected to the magnetic current element, and the other end different from the one end of the electric current element is arranged on the conductor plate side.

According to this application example, the antenna is cut into a half and is placed on the conductor plate. By this, the remaining half of the antenna is operated by an electrical mirror image generated on the conductor plate. By this, further miniaturization is possible. Besides, there is an effect that even if an electric component or an oscillation circuit or a digital circuit which is liable to generate noise is placed just under the conductor plate, the influence can be eliminated.

Application Example 6

This application example is directed to the antenna of the application example described above, which includes a conductor plate which is connected to one end of the electric current element and faces the loop plane of the magnetic current element, and a power supply part to supply power to a part between one point on the magnetic current element or the electric current element and the conductor plate, the magnetic current element includes a loop element having a gap, the electric current element is arranged to cross the loop plane of the magnetic current element, and one end thereof is connected to the magnetic current element.

According to this application example, the antenna is supplied with power between the one point (power supply point) on the magnetic current element or the electric current element and the conductor plate through the power supply source. The optimum antenna radiation impedance can be obtained by changing the position of the power supply point, and matching can be performed without a specific matching unit.

Application Example 7

This application example is directed to the antenna of the application example described above, which includes a cubic dielectric body having at least two opposed surfaces, and a GND electrode provided on one of the surfaces of the dielectric body, the magnetic current element includes a first electrode provided on the other of the surfaces of the dielectric body, and the electric current element includes a second electrode to connect the first electrode and the GND electrode.

According to this application example, since the element and the electrode of the antenna of Application Example 6, in particular, are formed on the dielectric body, the further miniaturized antenna can be realized.

Application Example 8

This application example is directed to the antenna of the application example described above, wherein the second electrode is provided on a dielectric body surface continuous with the two surfaces of the dielectric body.

According to this application example, since the element and the electrode of the antenna of Application Example 6, in particular, are formed on the dielectric body, the further miniaturized antenna can be realized.

Application Example 9

This application example is directed to the antenna of the application example described above, which includes a tap provided from the first electrode or the second electrode, and a power supply unit to supply power to a part between the tap and the GND electrode.

According to this application example, since power supply can be performed by the tap, the manufacture is easy.

Application Example 10

This application example is directed to an electronic apparatus including the antenna of the application example described above.

According to this application example, a portable equipment which is small and is convenient for carrying can be realized using the features of the antenna of the application example of the invention.

Application Example 11

This application example is directed to the electronic apparatus of the application example described above, which includes an antenna part which includes the antenna and receives an electric wave signal having at least one of time measurement information and position measurement information, a reception part to receive and demodulate the electric wave signal received by the antenna part, a processing part to calculate at least one of time information and position information based on the signal demodulated by the reception part, a display part to display information based on at least one of the time information and the position information calculated by the processing part, and a housing including a conductive outer lower case and an insulative outer upper case to support the antenna constituting the antenna part.

According to this application example, the small electronic apparatus convenient for carrying can be provided which detects the position information or time information and can be used for navigation or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

A. First Embodiment

Figure 1A:
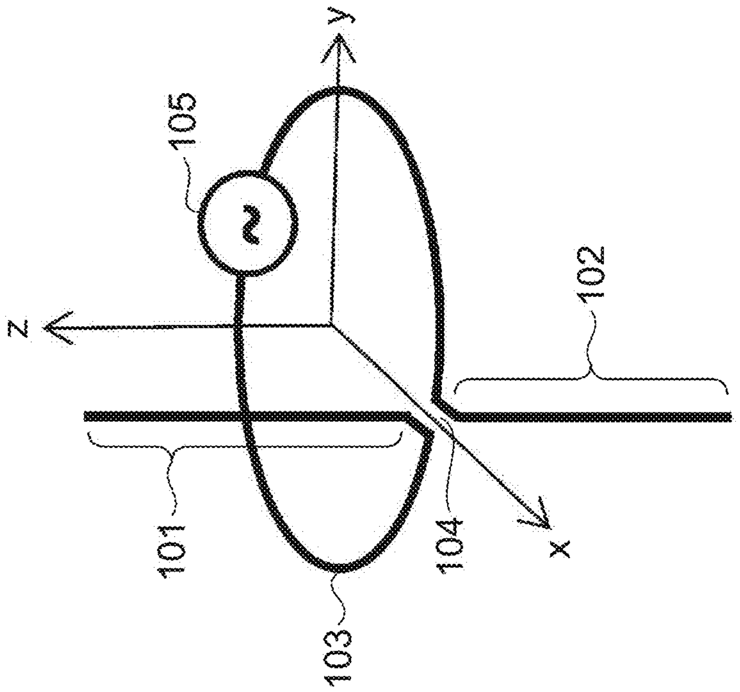
FIG. 1A is a perspective view showing an outer appearance of an antenna of a first embodiment.
Figure 1B:
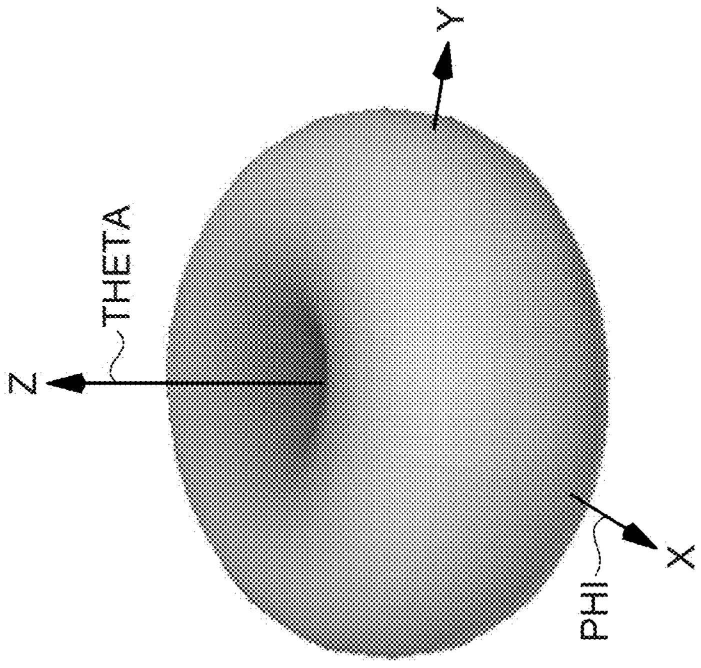
FIG. 1B is a view showing a directivity characteristic thereof.

FIG. 1A is a perspective view showing an outer appearance of an antenna of a first embodiment, and FIG. 1B is a view showing a directivity characteristic thereof. The antenna of the embodiment includes a loop-shaped loop element (magnetic current element) 103, and a first and a second linear element (electric current element) 101 and 102. These elements can be easily constructed by using a wire such as a copper wire or a pipe. The elements may be formed by bonding, etching, printing or the like of a conductive foil to a suitably shaped base. The loop element 103 has a gap 104, one end of the gap 104 is connected to one end of the first linear element 101, and the other end of the gap 104 is connected to one end of the second linear element 102.

Reference numeral 105 denotes a power supply source (power supply unit). In the embodiment, another gap is provided on the opposite side of the gap 104 of the loop element 103 and power is supplied. Although power is generally supplied by a transmission line such as a Lecher line, the illustration is omitted.

The linear elements 101 and 102 operate as electric current elements to generate electric current vectors, and the loop element 103 operates as a magnetic current element to generate a magnetic current vector.

Next, the operation principle of the antenna of the embodiment will be described with reference to FIGS. 2A to 2G.

Figure 2A:
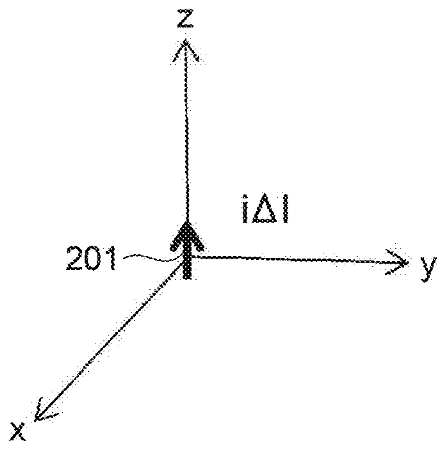
FIGS. 2A to 2G are views for explaining the principle of the antenna of the first embodiment.
Figure 2B:
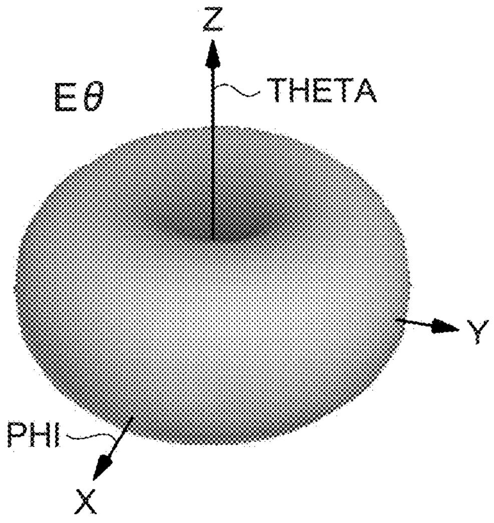

FIGS. 2A to 2G are views for explaining the principle of the antenna of the embodiment. As shown in FIG. 2A, a radiated electromagnetic field of an electric current fragment 201 placed on the coordinate origin in a z-axis direction and having an electric current value i and a length Δl exhibits non-directivity (doughnut-type directivity) on an xy plane as is well known (FIG. 2B). The radiated electric field has only a θ component and its magnitude $E_\theta$ is expressed by the following expression (1) in spherical coordinates (r, θ, ϕ).

$$E_\theta = j\omega\mu i\Delta l e^{-jkr}\sin\theta/(4\pi r) \quad (1)$$

Where, ω denotes an angular frequency of driving the antenna, μ denotes a vacuum magnetic permeability, k denotes a phase constant (=2π/λ), and λ denotes a wavelength (λ=2πc/ω, c denotes light speed $c=(\varepsilon\mu^{-1/2})$).

Figure 2C:
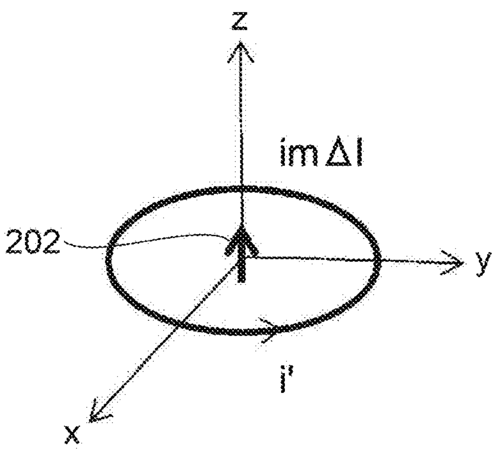
Figure 2D:
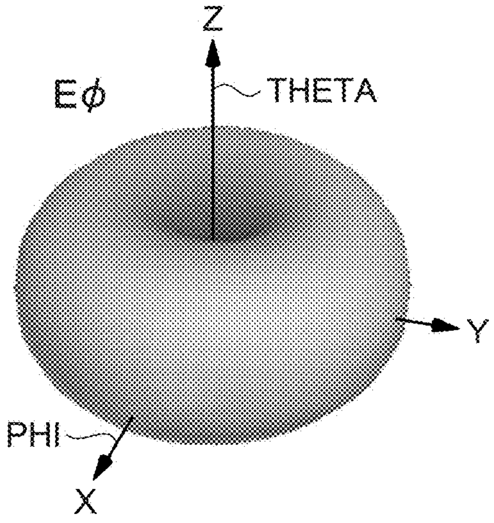

Similarly, as shown in FIG. 2C, a radiated electromagnetic field of a magnetic current fragment 202 placed on the coordinate origin in the z-axis direction and having a magnetic current value $i_m$ and a length Δl exhibits non-directivity (doughnut-type directivity) on the xy plane as is well known (FIG. 2D). The radiated electric field has only a ϕ component, and its magnitude $E_\phi$ is expressed by the following expression (2).

$$E_\phi = -i_m\Delta l jk e^{-jkr}\sin\theta/(4\pi r) \quad (2)$$

Although the expression (1) and the expression (2) respectively exhibit the cases where the uniform electric current value i and the magnetic current value $i_m$ flow over the length Δl, it is known that in a length of about half wavelength, even if the electric current value and the magnetic current value are not uniform and change like, for example, a trigonometric function, the directivity characteristics hardly change.

The magnetic current value $i_m$ can be generated by an electric current value i' flowing in a loop, and the magnitude thereof is expressed by the following expression (3), where the area of the loop is S.

$$i_m\Delta l = j\omega\mu i'S \quad (3)$$

When the expression (3) is substituted in the expression (2), the following expression (4) is obtained.

$$E_\phi = \eta k^2 i'S e^{-jkr}\sin\theta/(4\pi r) \quad (4)$$

Where, η denotes vacuum field impedance, and when vacuum dielectric constant is ε, $\eta=(\mu/\varepsilon)^{1/2}$ is obtained.

The magnitudes of the magnetic fields generated by the electric current fragment 201 and the magnetic current fragment 202 are respectively 1/η of the expression (1) and the expression (2) or the expression (4). The magnetic field generated by the electric current fragment 201 has only the ϕ component, and the magnetic field generated by the magnetic current fragment 202 has only the θ component.

When the expression (1) and the expression (4) are compared to each other, the directions of the electric fields are perpendicular to each other. In the expression (1), j is multiplied to the right side, while in the expression (4), j is not multiplied. Thus, if the phase of the current flowing through the electric current fragment 201 and the phase of the current flowing through the loop constituting the magnetic current fragment 202 are identical to each other, the phases of the electric fields generated from both are different from each other by 90°, and a combined wave of those becomes a circularly polarized wave.

When the magnitudes of the electric fields generated by both are made the same, the complete circularly polarized wave can be generated. Thus, i, i', S and Δl have only to be determined from the expression (1) and the expression (4) so as to satisfy the expression (5).

$$\eta k^2 i'S=\omega\mu i\Delta l \qquad (5)$$

Incidentally, the magnetic fields generated from both are also perpendicular to each other, and the magnitudes are 1/η. Thus, also from the comparison of the generated magnetic fields, the above condition can be derived based on the same argument as the above.

Figure 2E:
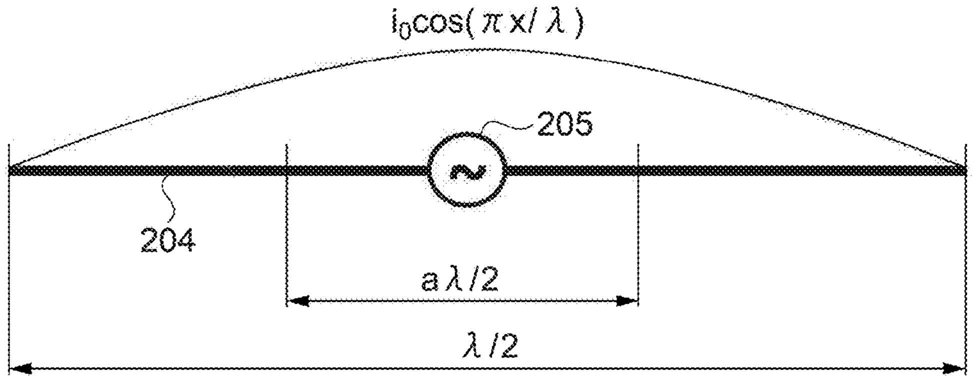

A half-wavelength dipole antenna shown in FIG. 2E will be considered. An antenna element 204 made of a conductor such as a copper wire has a length of λ/2 (λ denotes a wavelength), and a power supply source (power supply unit) 205 exists at the midpoint. When this antenna is driven at a frequency f=c/λ, a standing wave is generated on the antenna element 204, and a current distribution $i_d$ thereof is expressed by the following expression (6).

$$i_d=i_o\cos(\pi x/\lambda) \qquad (6)$$

Where, $i_o$ denotes a current value in the power supply source 205, and x denotes a distance from the power supply source 205.

Figure 2F:
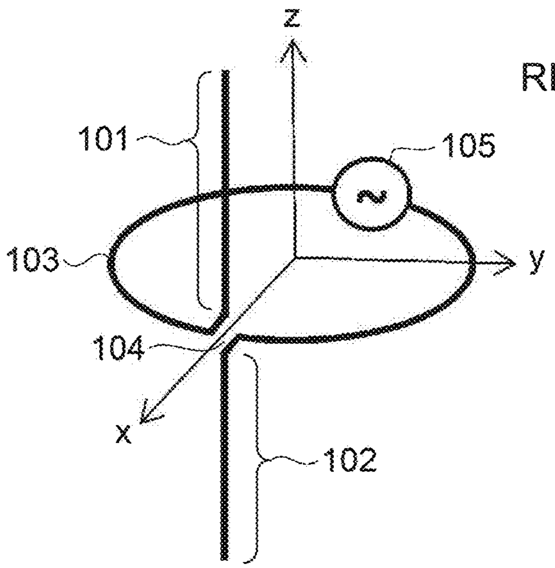
Figure 2G:
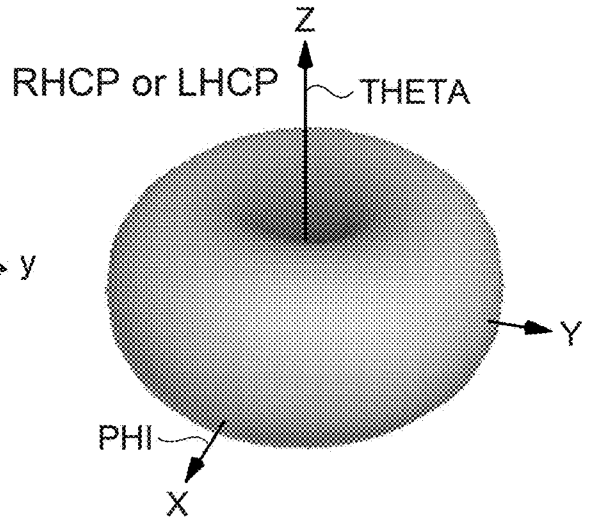

The half-wavelength dipole antenna is bent and the antenna of the embodiment shown in FIG. 1A is constructed. The antenna of the embodiment shown again in FIG. 2F is a combination of the antenna of the electric current fragment 201 of FIG. 2A and the antenna of the magnetic current fragment 202 of FIG. 2C. Unlike the electric current fragment 201 and the magnetic current fragment 202 of FIGS. 2A and 2C, the size of the antenna of FIG. 2F is not sufficiently small as compared with the wavelength and has the size of about a half wavelength. However, the characteristics are not much changed till the size of about the half wavelength as described above. As shown in FIG. 2E, the center portion with a length of aλ/2 (a denotes a positive real number not larger than 1) of the antenna element 204 constitutes the loop element 103, and the remaining portion constitutes the linear elements 101 and 102. The lengths of the loop element 103 and the linear elements 101 and 102 and the average value of distributed currents are approximated by straight lines and are respectively obtained as follows.

Loop element: length aλ/2, average current value $i_o(1+\cos(a\pi/4)/2$, linear element: length (1−a)λ/2, average current value $i_o\cos(a\pi/4)/2$. Consequently, from the above, i'S and iΔl are as follows.

$$i'S=\{io(1+\cos(a\pi/4))/2\}\pi\{(a\lambda)/(4\pi)\}^2$$

$$i\Delta l=\{i_o\cos(a\pi/4)/2\}\{(1-a)\lambda/2\}$$

When these are substituted in the expression (5), a is obtained as a≈0.71.

Actually, the current distribution obtained when the dipole antenna is bent as shown in FIG. 2F is not accurately the trigonometric function, and the displacement current leaks also from the tips of the linear elements 101 and 102. The above is the approximate calculation and merely gives the rough value. The more accurate value of a can be determined by simulation such as a moment method.

Besides, in the antenna of the embodiment shown in FIG. 2F, although the magnetic current vector generated by the loop element 103 is located at the coordinate origin, the electric current vector generated by the linear elements 101 and 102 is not located at the coordinate origin. Although this is accurately different from FIG. 2A, if the directions of the electric current vector and the magnetic current vector are parallel to each other, and the distance therebetween is a short distance not larger than the half wavelength, the performance does not much vary.

The phases of currents flowing through the linear elements 101 and 102 and the loop element 103 must be the same. Accordingly, driving must be performed so that standing waves exist on those elements. Thus, the antenna of the embodiment is not a traveling wave type antenna. In order to cause the direction of the current to be directed in a constant direction, the total electric length of those elements is preferably ½ or less of the wavelength of the driving electromagnetic wave.

FIGS. 3A to 3I are views for explaining the performance of the antenna of the embodiment, and show results obtained when the antenna of the embodiment is simulated by the moment method. Dimensional details of the simulation model are as follows. The material of the antenna is a copper wire with a diameter of 0.6 mm, λ/2 is 95.2 mm (frequency: 1.575 GHz), and a is 0.65.

Figure 3A:
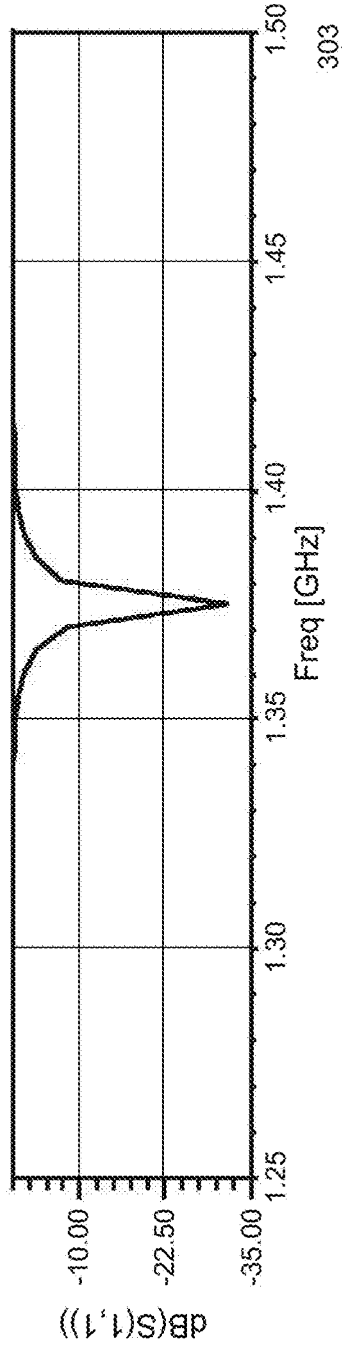
FIGS. 3A to 3I are views for explaining the performance of the antenna of the first embodiment.

FIG. 3A shows a S11 characteristic. However, renormalization is performed with an impedance of 2.5Ω. A frequency at which S11 becomes minimum, that is, a resonant frequency is 1.375 GHz, and is significantly shifted from the originally planned frequency of 1.575 GHz. This is due to a shortening effect which is caused because a part of the antenna element is made the loop so that the reactance component (inductance component) of the element is increased. Matching to a target frequency can be performed by shortening the element size. Although the radiation impedance is as very low as 2.5Ω, the band of S11<−10 dB is 10 MHz and is significantly wide.

Figure 3B:
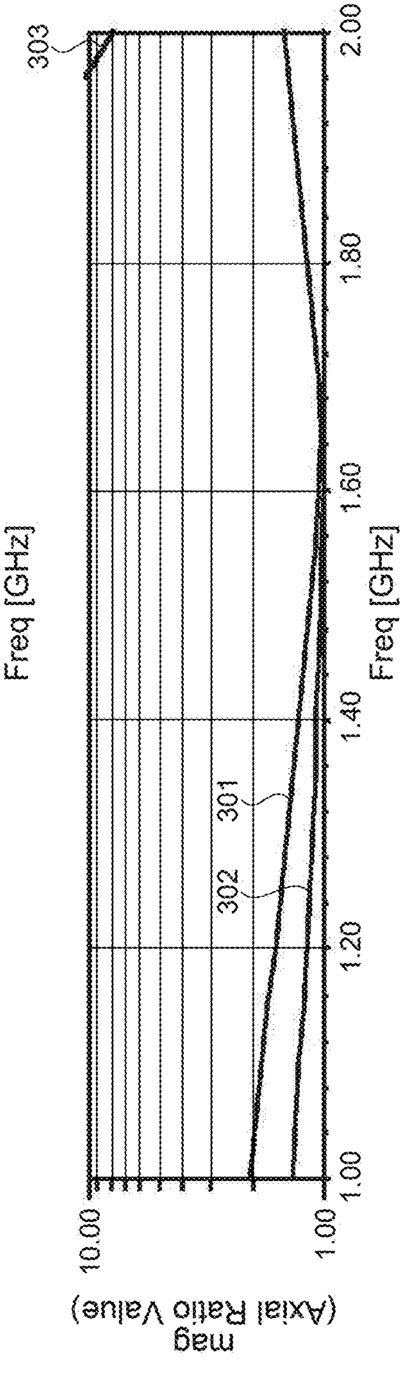

FIG. 3B shows a frequency characteristic of an axial ratio of an electromagnetic field radiated from the antenna. Reference numeral 301 denotes an axial ratio (x-axis direction axial ratio) of the electromagnetic field radiated in the x-axis direction, 302 denotes an axial ratio (y-axis direction axial ratio) of the electromagnetic field radiated in the y-axis direction, and 303 denotes an axial ratio (z-axis direction axial ratio) of the electromagnetic field radiated in the z-axis direction. In the direction in which the electromagnetic wave is not radiated, that is, in the z-axis direction axial ratio 303, the axial ratio greatly extends outside the graph and is not shown. However, in the x-axis and y-axis direction axial ratios 301 and 302 in the main radiation direction, the axial ratio is 2 or less in the wide frequency range (1 to 2 GHz). The circularly polarized wave characteristic of the antenna of the embodiment is very excellent in the wide frequency range, and this characteristic cannot be obtained by the prior art patch antenna or the like.

Figure 3C:
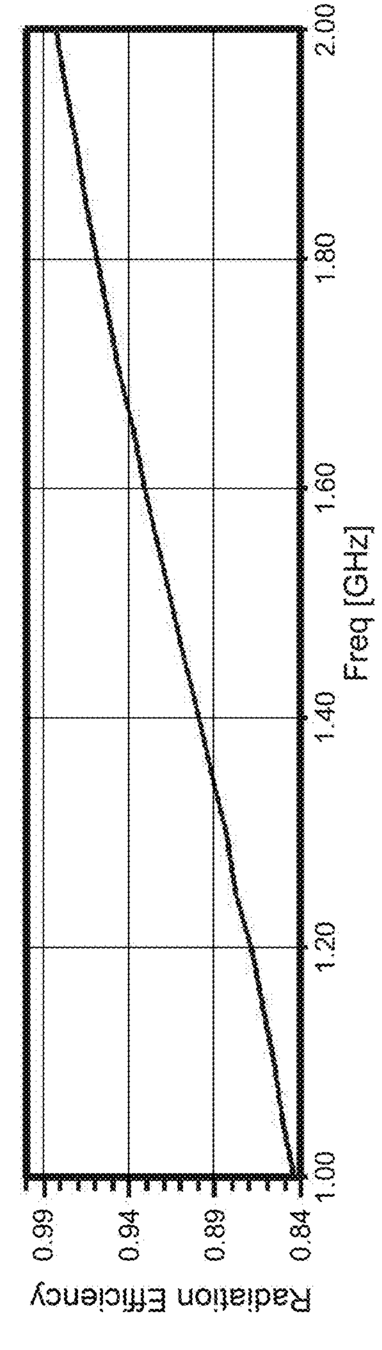

FIG. 3C shows a radiation efficiency of the antenna of the embodiment. The radiation efficiency is about 90% in a wide frequency range, and exhibits a very excellent characteristic as compared with 20 to 30% of the patch antenna or the like.

Figure 3D:
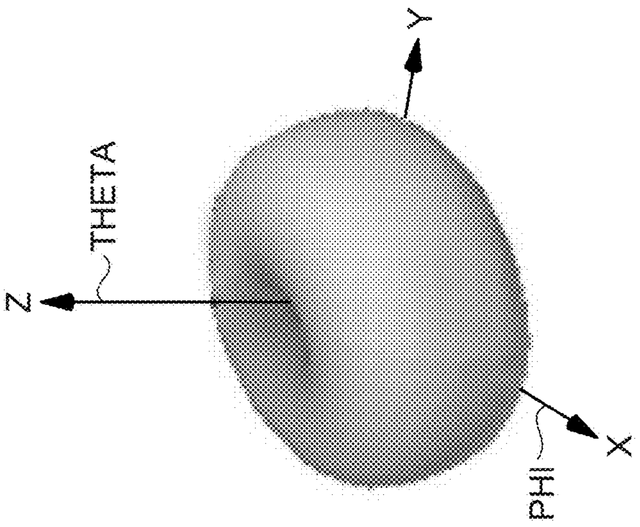
Figure 3E:
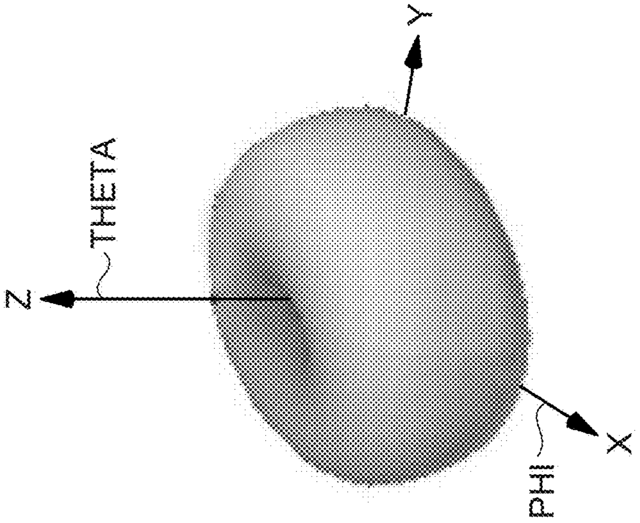
Figure 3F:
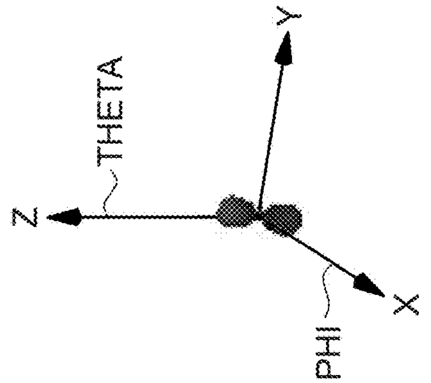
Figure 3G:
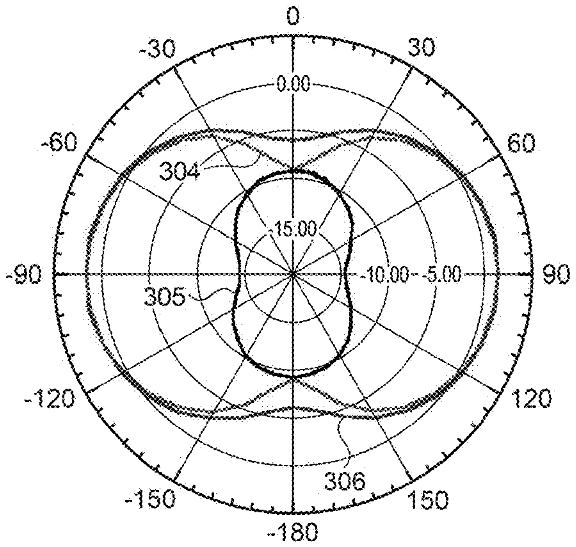
Figure 3H:
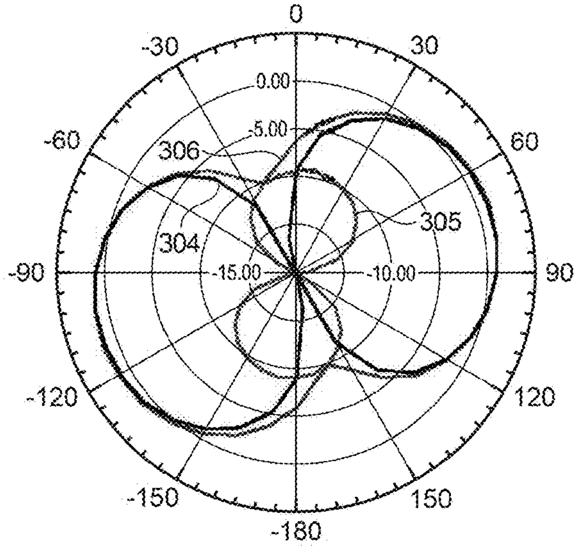
Figure 3I:
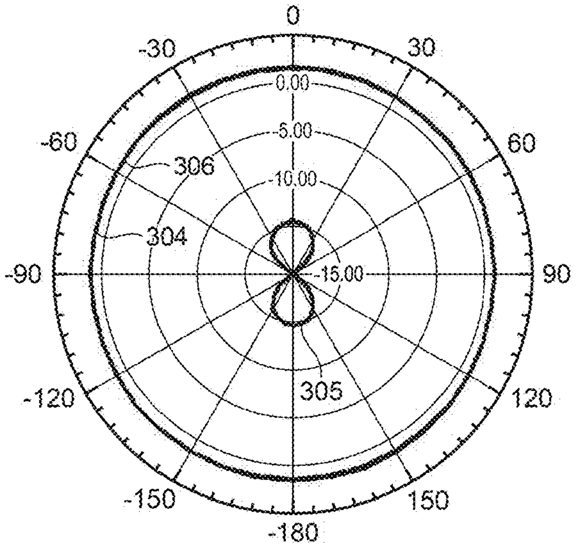

FIGS. 3D, 3E and 3F are respectively 3D polar coordinate plots indicating a total gain, a right-handed circularly polarized wave gain and a left-handed circularly polarized wave gain. FIGS. 3G, 3H and 3I are respectively polar coordinate plots indicating the total gain, the right-handed circularly polarized wave gain and the left-handed circularly polarized wave gain in the xz plane, yz plane and xy plane (frequency is 1.375 GHz, unit is dBi). Reference numeral 306 denotes the total gain, 304 denotes the right-handed circularly polarized wave gain, and 305 denotes the left-handed circularly polarized wave gain. In FIG. 3I, the total gain 306 and the right-handed circularly polarized wave gain 304 overlap each other. The right-handed circularly polarized wave gain 304 has an omnidirectional directivity (donut type directivity), and the circularly polarized wave with the excellent axial ratio over the wide space range can be radiated.

As is understood from FIGS. 3D to 3H, the donut type directivity is slightly inclined. This is because the standing wave current on the loop element 103 is not uniform and is unbalanced. Although the inclination of the donut type directivity can be easily avoided by inclining and setting the antenna, there are many cases where this is rather convenient according to applications.

As described above, the antenna of the embodiment generates the right-handed circularly polarized wave. In order to obtain the antenna of the left-handed circularly polarized wave, the connection between the linear elements 101, 102 and the loop element 103 has only to be changed so that the mirror image inversion of FIG. 1A is obtained.

B. Modified Examples

The embodiment is not limited to the foregoing embodiment and can be modified, for example, as described below. Besides, two or more modifications described below can be suitably combined.

FIGS. 4A to 4D are perspective views showing outer appearances of modified examples of the antenna of the embodiment.

Modified Example 1

Figure 4A:
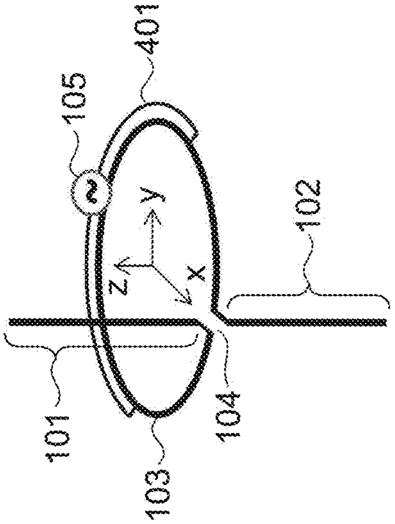
FIGS. 4A to 4D are perspective views showing outer appearances of modified examples of the antenna of the first embodiment.

The radiation impedance of the antenna of the first embodiment is very low. As shown in FIG. 4A, a stub 401 is added so that the radiation impedance can be adjusted. Incidentally, for simplification of the following description, an already-described portion is denoted by the same reference numeral and its description is omitted.

Modified Example 2

Figure 4B:
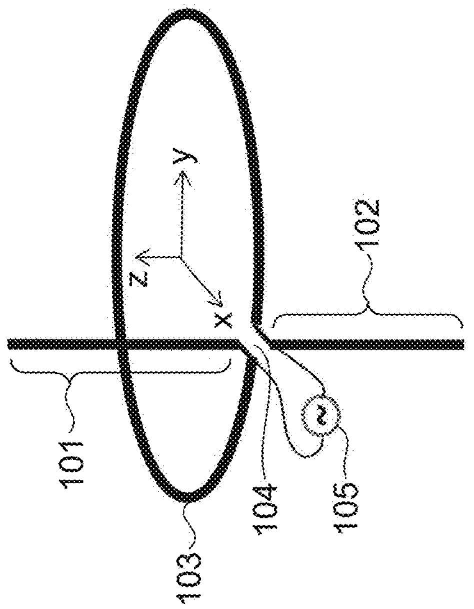

In FIG. 4B, a power supply source 105 is located in a gap 104 of a loop element 103. This may be considered such that the stub connection point of FIG. 4A is moved to the gap 104. In this case, the loop element 103 and the linear elements 101 and 102 are connected in parallel when seen from the power supply side, values of currents flowing to the respective elements are easily adjusted and the frequency band can also be widened.

Modified Example 3

Figure 4C:
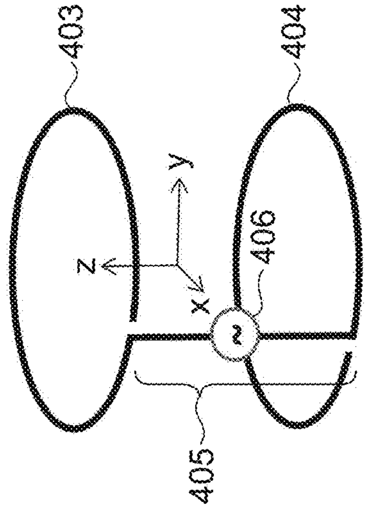

FIG. 4C shows an example including a first and a second loop element (magnetic current element) 403 and 404 and one linear element (electric current element) 405. A power supply point is placed at the center of the linear element 405 and is connected to a power supply source (power supply unit) 406. Since the linear element 405 is driven by a portion of a large current value of a standing wave current, as compared with the first embodiment of FIG. 1A, further miniaturization is possible. The sizes of the first and the second loop element 403 and 404 and the linear element 405 can be determined by the same calculation and method as those of the embodiment.

Modified Example 4

Figure 4D:
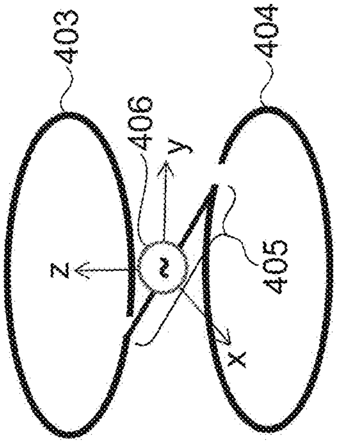

In FIG. 4D, a first and a second loop element 403 and 404 are arranged so as to be symmetrical with respect to the coordinate origin in order to reduce the influence of an unbalance between standing wave currents flowing through the first and the second loop element 403 and 404. In this case, an electric current vector generated by a linear element 405 and magnetic current vectors generated by the first and the second loop element 403 and 404 do not become parallel to each other. However, since the electric current vector has a component parallel to the magnetic current vector, the influence on generation of a circularly polarized wave is low.

Modified Example 5

Although the description is made while using an example in which the loop element 103, 403 or 404 forming the magnetic current element is the circular coil the number of turns of which is 1, no limitation is made to this. A polygon such as a quadrilateral or a shape such as an ellipse may be adopted. Besides, the number of turns is not limited to 1, and may be suitably determined within a range of 0.5 or more.

C. Second Embodiment

Figure 5A:
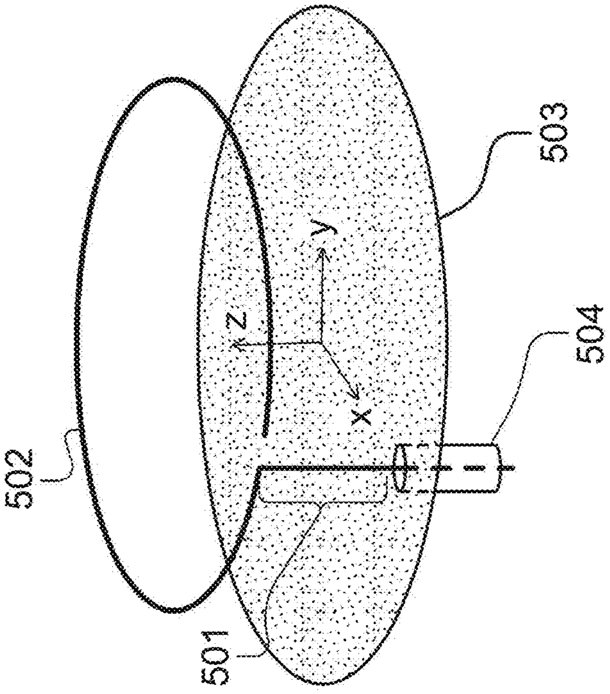
FIGS. 5A and 5B are perspective views showing outer appearances of antennas of a second embodiment.
Figure 5B:
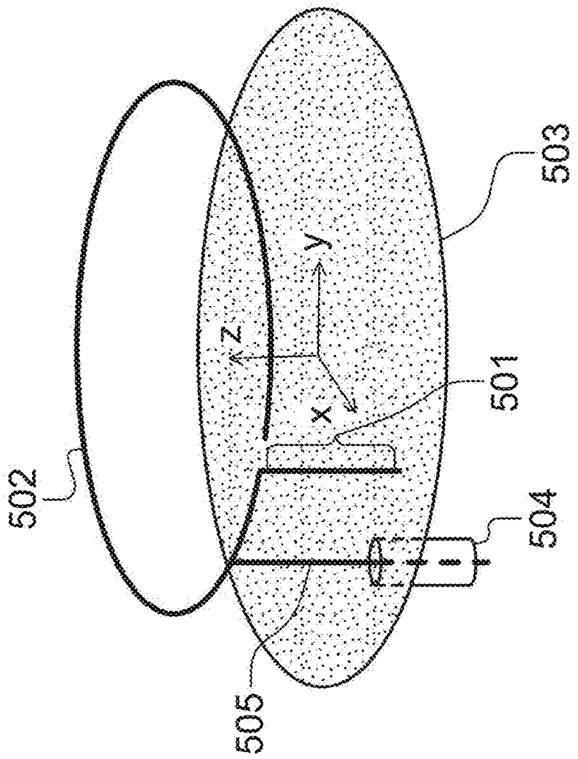

FIGS. 5A and 5B are perspective views showing outer appearances of antennas of this embodiment. First, FIG. 5A will be described. FIG. 5A is a perspective view of this embodiment. The antenna of this embodiment includes a loop-shaped loop element (magnetic current element) 502, a linear element (electric current element) 501, and a conductor plate 503. The loop element 502 is the magnetic current element to generate a magnetic current vector at the coordinate origin, and the linear element 501 is the electric current element to generate an electric current vector parallel to the magnetic current vector. The conductor plate 503 operates as a ground electrode.

Reference numeral 504 denotes a coaxial cable for power supply. The linear element 501 is supplied with power from the lower surface of the conductor plate 503 through a small hole formed in the conductor plate 503.

The linear element 501 and the loop element 502 are insulated from a part below the conductor plate 503 by the shielding effect of the conductor plate 503. By this, even if an electronic circuit component, a board, a human body or the like exists just under the antenna, its influence can be eliminated. Thus, in application to a high-density mounting portable electronic apparatus, this embodiment is very effective in miniaturization of an equipment.

In FIG. 5B, a stub 505 is attached to the antenna of FIG. 5A and a power supply point is moved. By this structure, matching for power feeding to the antenna can be easily performed.

D. Third Embodiment

Figure 6B:
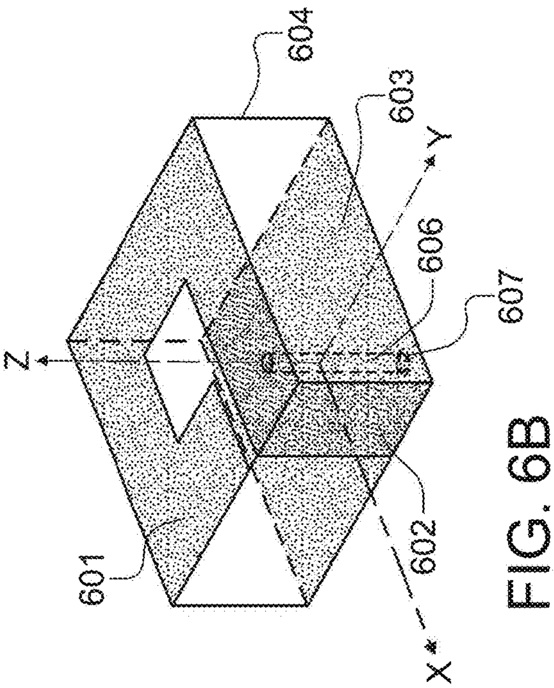
FIGS. 6A to 6C are perspective views showing outer appearances of antennas of a third embodiment.
Figure 6A:
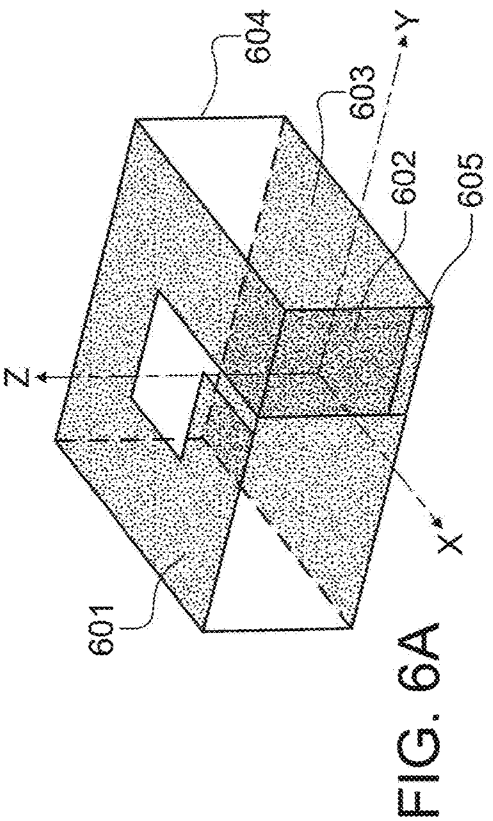
Figure 6C:
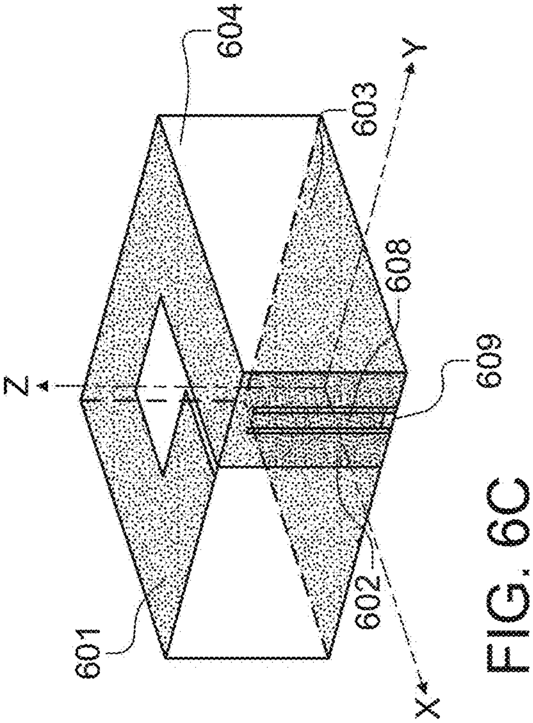

FIGS. 6A to 6C are perspective views showing outer appearances of antennas of this embodiment, and FIG. 6A is a perspective view of this embodiment. The antenna of this embodiment includes a loop electrode (first conductor electrode) 601 formed on an upper surface of a dielectric body 604, a ground electrode 603 formed on a lower surface of the dielectric body 604, and a linear electrode (second conductor electrode) 602 formed on a side surface of the dielectric body 604. These electrodes can be formed by etching or cutting a conductive metal formed on the dielectric body by plating or coating. The electrodes may be directly painted by using a conductive paint.

The antenna of this embodiment is such that the antenna shown in FIG. 5A is formed so as to surround the dielectric body. The size of the antenna can be made small by the function of the dielectric body 604. The loop electrode 601 functions as a first conductor electrode (magnetic current element), and the linear electrode 602 functions as a second conductor electrode (electric current element). The ground electrode 603 generates electrical mirror images of the loop electrode 601 and the linear electrode 602, and further insulates a part below the antenna and eliminates the influence of an electronic component, a board, a human body or the like placed just under the antenna.

A gap 605 between the linear electrode 602 and the ground electrode 603 becomes a power supply point.

The size of the antenna of this embodiment can be made very small by the dielectric body 604. Although the radiation efficiency is slightly reduced by loss in the dielectric body 604, an excellent circularly polarized wave characteristic and a wide frequency band are obtained.

In FIG. 6B, in order to perform matching for power feeding, a tap is drawn from a loop electrode 601 by a pin 606 penetrating a dielectric body, and power supply is performed by connecting a coaxial cable or the like from a lower surface of the antenna through a small hole 607 formed in a ground electrode 603. The optimum radiation impedance can be obtained by the tap position. According to the shape of a dielectric body 604, the optimum position of the pin 606 excessively approaches a side surface of the dielectric body 604 and machining can be difficult. In this case, a method described below is effective.

In FIG. 6C, power supply is performed by a strip line 608 provided on a linear electrode 602, not by the pin 606 in FIG. 6B. A gap 609 between a ground electrode 603 and the strip line 608 becomes a power supply point. In this antenna, it is not necessary to form the pin 606 unlike FIG. 6B and the manufacture is easy.

E. Modified Examples

The embodiment is not limited to the foregoing embodiment, and can be modified as described below. Besides, two or more modifications described below can be suitably combined.

Modified Example 6

Although the description is made while using an example in which the shape of the dielectric body 604 is a rectangular parallelpiped, no limitation is made to this. The loop electrode 601, the linear electrode 602 and the ground electrode 603 have only to be placed on a surface of a cylinder, a polygonal column, another polyhedron, a sphere, a spheroid or the like, so that generated current vector and magnetic current vector are perpendicular to each other.

Modified Example 7

FIGS. 7A to 7D are perspective views showing outer appearances of modified examples of the antenna of the embodiment.

Figure 7A:
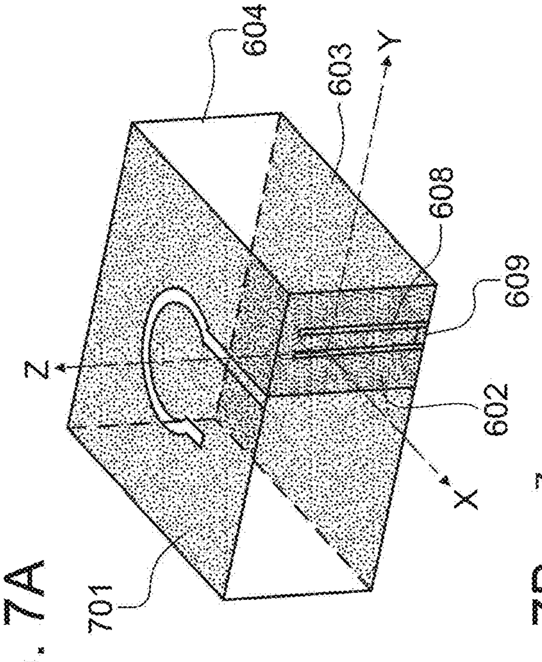
FIGS. 7A to 7D are perspective views showing outer appearances of modified examples of the antenna of the third embodiment.

FIG. 7A shows a modified example of this embodiment. A loop electrode (first conductor electrode) can be made to have a shape as indicated by 701. By doing so, the number of turns of the loop slightly increases and the antenna shape can be miniaturized.

Modified Example 8

Figure 7B:
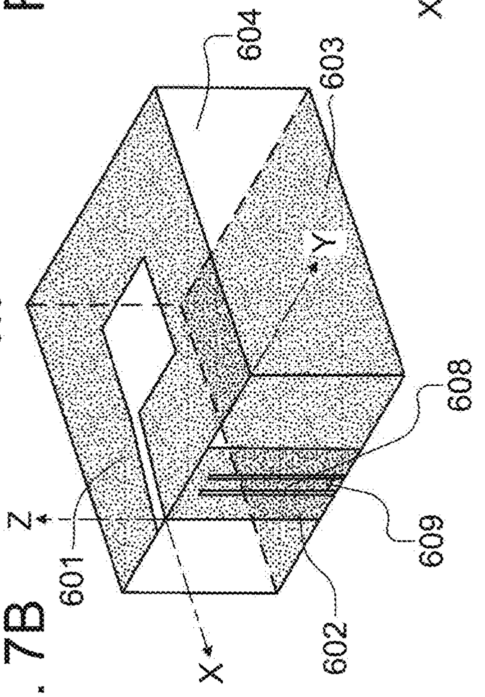

FIG. 7B shows another modified example of this embodiment. In this modified example, a linear electrode 602 is moved to the center of a side surface of a dielectric body 604. The power supply position can be suitably changed so that wiring is easily performed at the time of mounting.

Modified Example 9

Figure 7C:
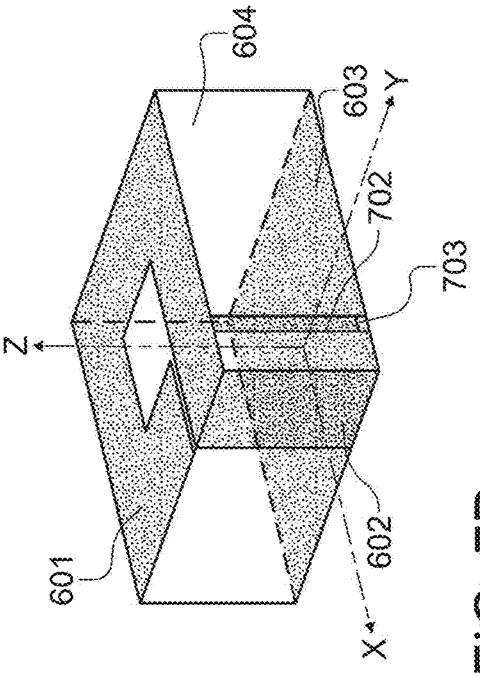

FIG. 7C shows another modified example of this embodiment. In this modified example, instead of performing power supply by providing the tap on the loop electrode 601 and by the pin 606 as in FIG. 6B, power supply is performed by a strip line 702 placed on a side surface of a dielectric body 604. A gap 703 between the strip line 702 and a ground electrode 603 becomes a power supply point.

Figure 7D:
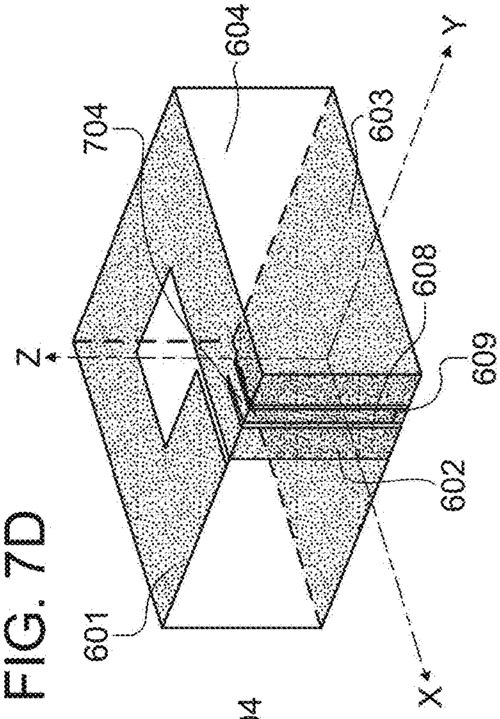

FIG. 7D shows still another modified example of this embodiment. As in the modified example of FIG. 7C, when the tap point must be provided on the loop electrode 601, a strip line 608 may be extended to a middle of the loop electrode 601 as indicated by 704 of FIG. 7D.

F. Application Examples

The first to the third embodiments can be applied to various communication apparatuses and electronic apparatuses. Hereinafter, a preferred example of an electronic apparatus of the embodiment will be described with reference to the attached drawings. Here, an electronic apparatus applied to a communication system which receives and uses a position measurement signal and the like of an electric wave from a position information satellite or the like is used as an example, and its outline will be described. The communication system is a so-called GPS (Global Positioning System) system.

Figure 8:
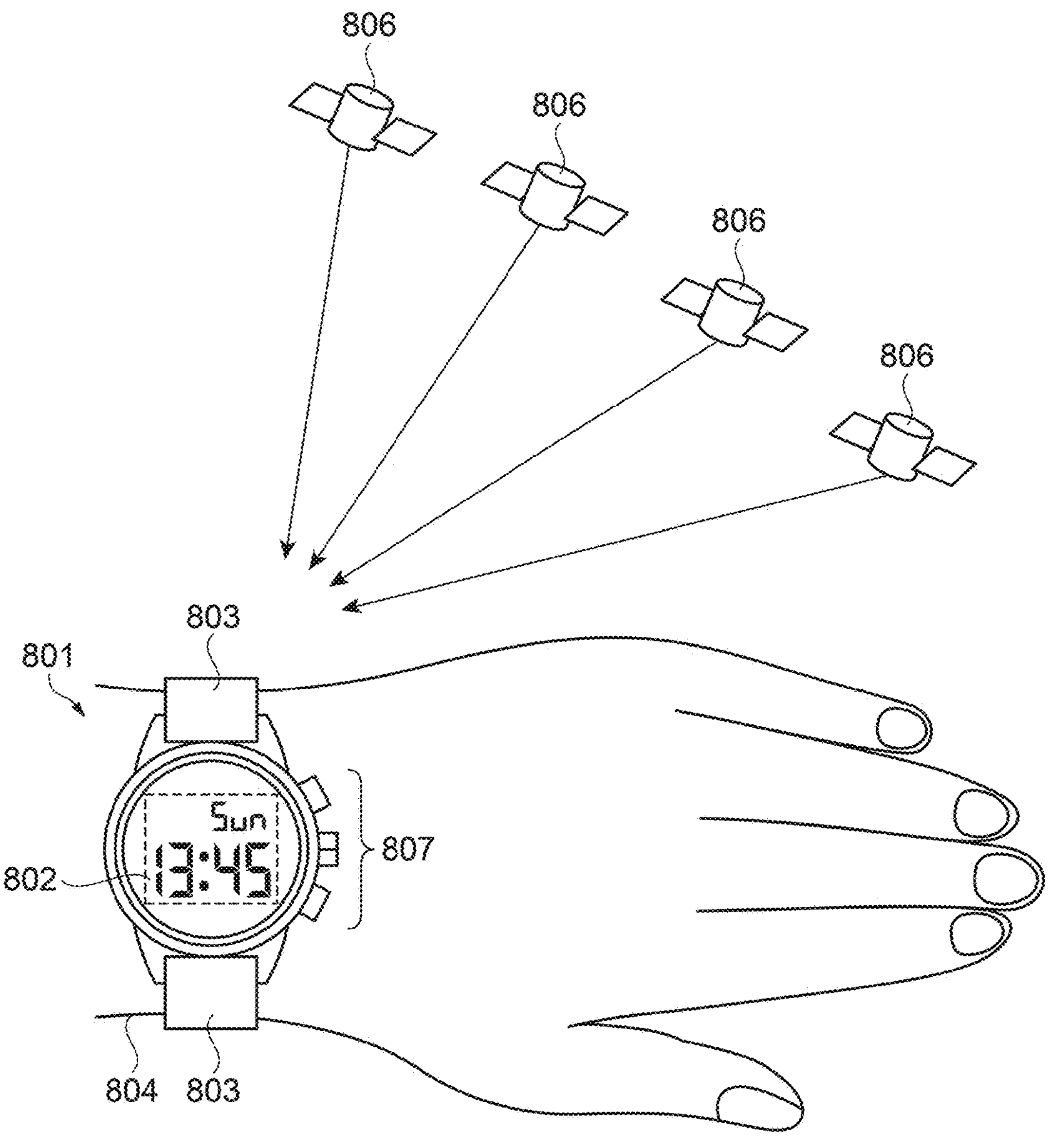
FIG. 8 is a perspective view showing an outer appearance of an electronic apparatus of an embodiment.

FIG. 8 is a perspective view showing an outer appearance of the electronic apparatus of this embodiment. An electronic apparatus 801 shown in FIG. 8 is an electronic wrist watch used to be mounted on a human wrist 804 by a belt 803 and having a position measuring function.

A GPS satellite 806 is a position information satellite going around a specific orbit above the Earth, and transmits a satellite signal to the ground, in which a navigation message and the like are superimposed on a microwave of, for example, 1.57542 GHz. The GPS satellite 806 has an atomic clock, and the satellite signal includes GPS time information as very accurate time information measured by the atomic clock. Thus, the electronic wrist watch (electronic apparatus) 801 having the function as the GPS receiver receives the satellite signal, and can display the accurate time by correcting advance or delay of the inner time. This correction is performed in a time measurement mode.

The satellite signal includes also orbit information indicating the position on the orbit of the GPS satellite 806. That is, the electronic wrist watch 801 can also perform position measurement calculation, and generally has a function in which the satellite signals transmitted from four or more GPS satellites are received, and the position measurement calculation is performed using the orbit information and the GPS time information included therein. By the position measurement calculation, the electronic wrist watch 801 can easily correct the time difference in accordance with the present position, and this correction is performed in the position measurement mode. The electric wave generated by the GPS satellite is a right-handed circularly polarized wave, and variation in reception sensitivity by the posture of the reception antenna and error in time and position measurement by the influence of multi-path in places between buildings are made minimum.

In addition, various applications, such as present position display, movement distance measurement and movement speed measurement, can be performed by using the satellite signal, and the electronic wrist watch 801 can digitally display these information on a liquid crystal panel 802 as a display part. A switch press button 807 is an input device for operating the electronic wrist watch 801. The press button 807 is operated to perform switching of information displayed on the liquid crystal panel 802 and other various controls.

Next, a circuit structure of the electronic wrist watch 801 having the GPS reception function will be described.

Figure 9:
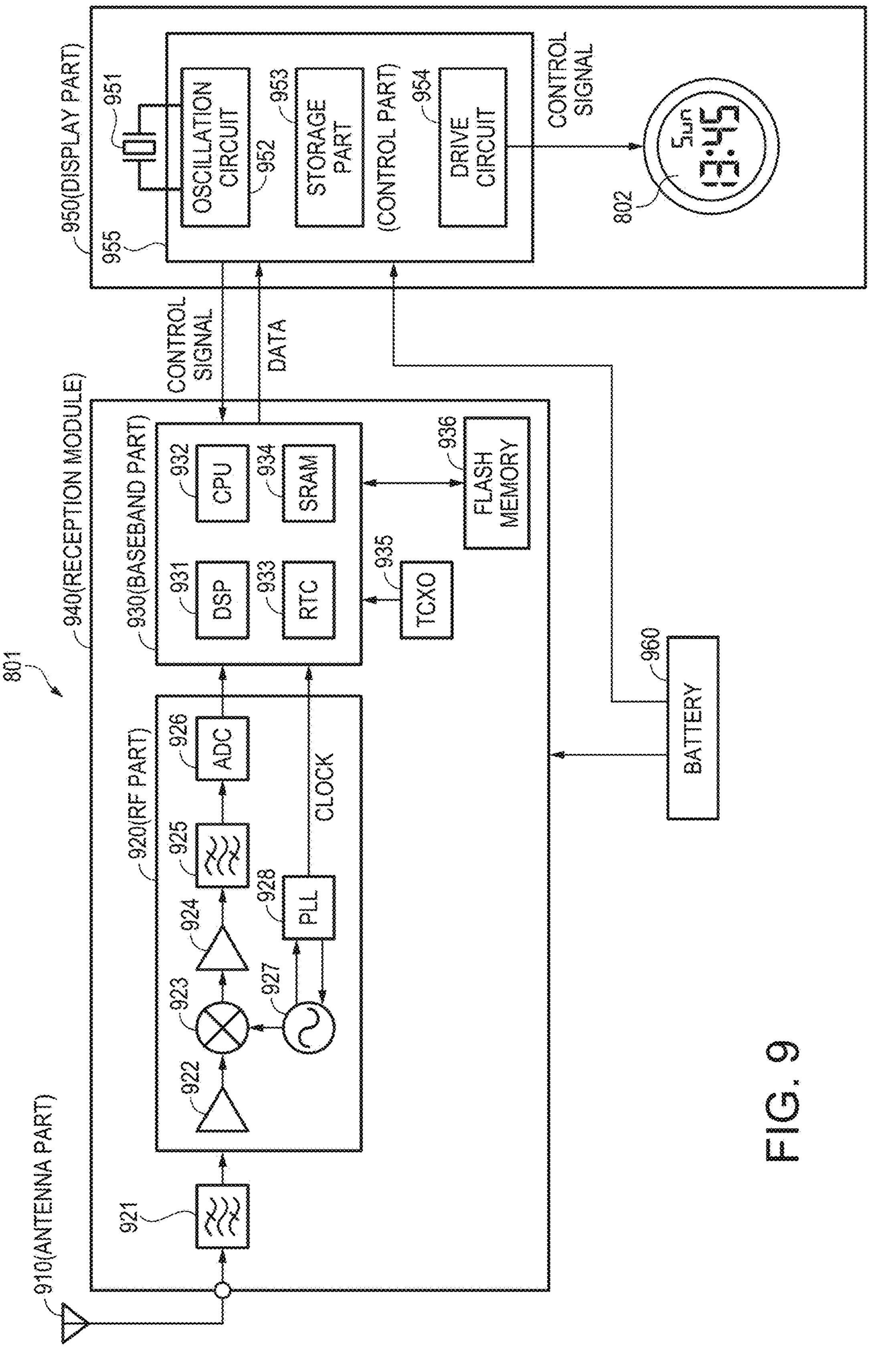
FIG. 9 is a block diagram for explaining the electronic apparatus of the embodiment.

FIG. 9 is a block diagram for explaining the electronic wrist watch 801 of this embodiment. As shown in FIG. 9, the electronic wrist watch 801 includes an antenna part 910, a reception module (reception part) 940, a display part 950 including a control part (processing part) 955, and a battery 960.

The reception module 940 is connected with the antenna part 910 and includes a SAW (Surface Acoustic Wave) filter 921, an RF (Radio Frequency) part 920 and a baseband part 930. The SAW filter 921 performs a process of extracting a satellite signal from an electric wave received by the antenna part 910. The RF part 920 includes an LNA (Low Noise Amplifier) 922, a mixer 923, a VCO (Voltage Controlled Oscillator) 927, a PLL (Phase Locked Loop) control circuit 928, an IF (Intermediate Frequency) amplifier 924, an IF filter 925, and an ADC (A/D converter) 926.

The satellite signal extracted by the SAW filter 921 is amplified by the LNA 922, is mixed with a local signal outputted from the VCO 927 by the mixer 923, and is down-converted into a signal of an intermediate frequency band. The PLL control circuit 928 and the VCO 927 form a phase locked loop, performs phase comparison between a signal obtained by dividing the local signal outputted by the VCO 927 and a stable reference clock signal, synchronizes the local signal with the reference clock signal by feedback, and generates and stabilizes the local signal with accurate frequency. The signal mixed by the mixer 923 is amplified by the IF amplifier 924, and an unnecessary signal is removed by the IF filter 925. The signal passing through the IF filter 925 is converted into a digital signal by the ADC (A/D converter) 926.

The baseband part 930 includes a DSP (Digital Signal Processor) 931, a CPU (Central Processing Unit) 932, a SRAM (Static Random Access Memory) 934 and an RTC (Real Time Clock) 933. Besides, the baseband part 930 is connected with a TCXO (Temperature Compensated Crystal Oscillator) 935, a flash memory 936, and the like.

The TCXO (Temperature Compensated Crystal Oscillator) 935 generates a reference clock signal whose frequency is almost constant irrespective of temperature. The flash memory 936 stores present position information, time difference information and the like. When the time measurement mode or the like is set, the baseband part 930 performs a process of demodulating the baseband signal from the digital signal converted by the ADC 926 of the RF part 920. Besides, the baseband part 930 acquires the satellite information, such as orbit information and GPS time information, included in the navigation message of the captured GPS satellite 806 and stores them in the SRAM 934.

The display part 950 includes the control part 955, a crystal oscillator 951 and the like. The control part 955 includes a storage part 953, an oscillation circuit 952 and a drive circuit 954, and performs various controls. The control part 955 controls the reception module 940, transmits the control signal to the reception module 940, and controls the reception operation of the reception module 940. Further, the control part controls the display of the liquid crystal panel 802 through the drive circuit 954 in the control part 955. The storage part 953 stores various information including inner time information. The battery 960 supplies energy required for the operation of the circuits and the display.

The control part 955, the CPU 932 and the DSP 931 cooperate to calculate the time measurement and position measurement information, and derives information, such as time, present position, movement distance and movement speed, based on the information. The control part 955 controls the display of the information on the liquid crystal panel 802, and controls the setting of the operation mode and display mode of the electronic wrist watch 801 in accordance with the operation of the press button 807 shown in FIG. 8. A high function such as navigation to display the present position on a map can also be provided.

Figure 10A:
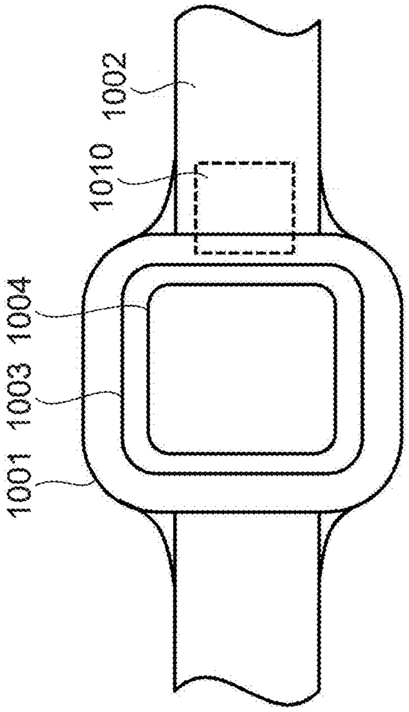
FIGS. 10A to 10D are plan views and sectional views of the electronic apparatus of the embodiment.
Figure 10B:
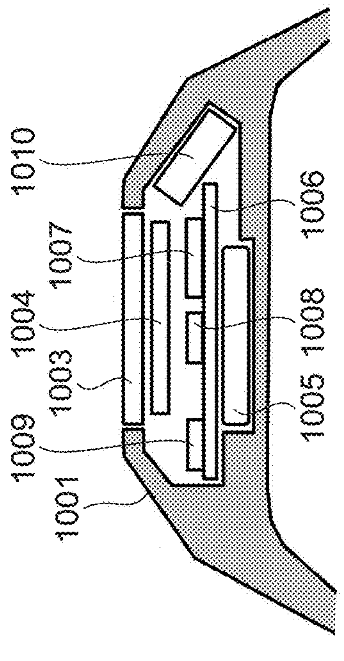

FIGS. 10A to 10D show mounting examples when the antenna of the embodiment is mounted as the antenna part. FIGS. 10A and 10B show an example in which the antenna of the third embodiment or the modified example is used. FIG. 10A is a plan view when the electronic wrist watch 801 is seen from above, and FIG. 10B is a sectional view. In the drawing, the scale is changed between the vertical and lateral directions in order to facilitate understanding of the structure, particularly the structure in the vertical direction (thickness direction).

In FIGS. 10A and 10B, reference numeral 1010 denotes the antenna of the third embodiment, and any antenna of the embodiment shown in FIGS. 6A to 6C and FIGS. 7A to 7D can be used. An outer case (housing) 1001 of the electronic wrist watch 801 is made of such an insulator as not to shield an electric wave. A belt 1002 (corresponding to the belt 803 in FIG. 8) is used for mounting on a wrist. A liquid crystal display body 1004 is put in parallel to and under a cover glass 1003, and the display is seen from outside. Reference numeral 1005 denotes a battery, and 1006 denotes a circuit board for mounting electronic circuits. An RF module 1007 for mounting the RF part 920 in FIG. 9, a baseband module 1008 for mounting the baseband part 930, a control module 1009 for mounting the control part 955, and the like are mounted on the circuit board.

It is needless to say that the ground electrode 603 side of the antenna 1010 is mounted on the circuit board 1006 side. By mounting in this way, the directivity can be made non-directive on the plane in the direction from upper left to lower right of FIG. 10B. When it is assumed that the electronic wrist watch 801 is mounted on the left arm and is used, it is desirable from the viewpoint of antenna sensitivity that the right side in the drawing is the bottom of the display screen. Since the ground electrode of the antenna 1010 performs shielding from the wrist 804 and the circuit board 1006, the influence of these can also be eliminated, and the antenna can be mounted in the narrow space.

Figure 10C:
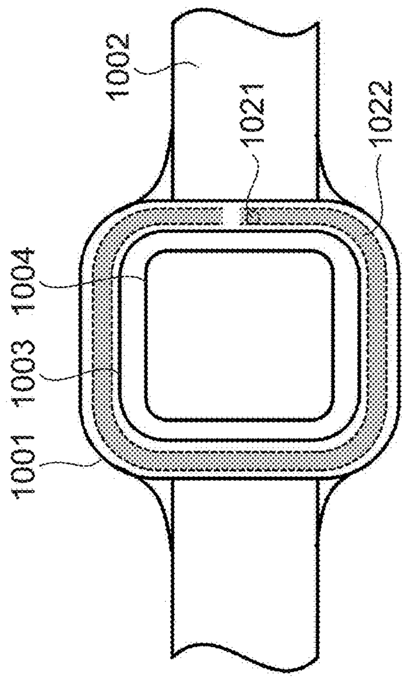
Figure 10D:
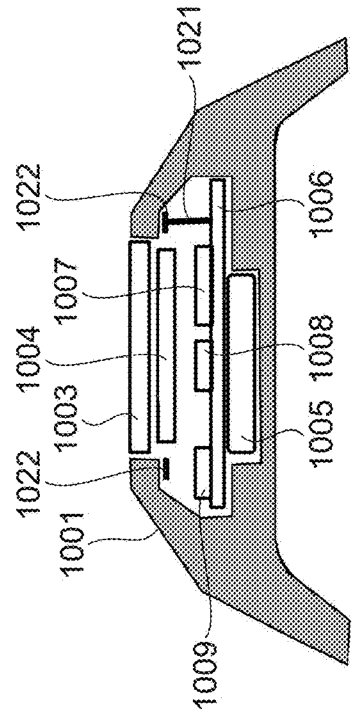

FIGS. 10C and 10D show an application example in which the antenna of the second embodiment is mounted, and any antenna of the embodiment shown in FIGS. 5A and 5B can be used. The same portions as those of FIGS. 10A and 10B are denoted by the same reference numerals and their description is omitted.

Reference numeral 1021 denotes the linear element (electric current element) 501 in the antenna of the second embodiment, and 1022 denotes the loop element (magnetic current element) 502. The conductor plate 503 is formed on a circuit board 1006. When the loop element 502 and the linear element 501 are so large that they cannot be neglected as compared with a wavelength, the omnidirectional directivity is exhibited. However, the direction thereof is inclined from the loop plane of the loop element 502. By this, even if the inclined mounting is not performed unlike the antenna of the third embodiment, excellent directivity characteristics can be obtained.

Although the description is made while using the electronic wrist watch using GPS as the application example to the electronic apparatus, no limitation is made to this. Also when the antenna is mounted on a cellular phone, a digital camera, a combined apparatus of those or an apparatus such as a wireless tag, the effect is high.

As described above, the antenna of the embodiment is the antenna capable of receiving and transmitting the circularly polarized wave, has the wide directivity range and the omnidirectional directivity, and has the excellent circularly polarized wave characteristic over the wide frequency range. Further, the miniaturization is possible, the efficiency is high, and the loss is low.

What is claimed is:

1. An antenna for receiving signals, the antenna comprising:
- a power supply element;
- a loop element that generates a magnetic current vector having a component perpendicular to a loop plane, the loop element forming a single loop having a single gap; and
- a linear element that generates an electric current vector having a component parallel to the magnetic current vector, the linear element being connected to one end of the single loop at the single gap,
- wherein a sum of electric lengths of conductors constituting the loop element and the linear element is half or less of a wavelength of a driving electromagnetic wave, and
- wherein the power supply element is arranged according to one of:
  - at a point on the loop element away from the single gap,
  - on a stub element having one end connected to a location on the loop element away from the single gap, or
  - through a conductor plate facing the loop plane of the loop element.

2. The antenna according to claim 1, wherein
- the linear element is a first linear element having a first linear portion placed above one surface of the loop plane, and
- the antenna further comprises a second linear element having a second linear portion placed above the other surface of the loop plane.

3. A communication apparatus comprising an antenna according to claim 2.

4. The antenna according to claim 1, wherein
- one end of the linear element is arranged on the conductor plate side.

5. A communication apparatus comprising an antenna according to claim 4.

6. The antenna according to claim 1, wherein
- the linear element is arranged perpendicular to the loop plane of the loop element.

7. A communication apparatus comprising an antenna according to claim 6.

8. A communication apparatus comprising an antenna according to claim 1.

9. The communication apparatus according to claim 8, wherein the antenna is an antenna to receive an electric wave signal having at least one of time measurement information and position measurement information, and
- the communication apparatus further comprises:
  - a processing part to calculate information based on the electric wave signal received by the antenna, and
  - a display part to display the information calculated by the processing part.

10. The communication apparatus according to claim 9, wherein the information is at least one of present time, present position, movement distance, movement speed and height.

11. The communication apparatus according to claim 9, wherein the electric wave signal is a signal transmitted from a position information satellite.

12. An antenna for receiving signals, the antenna comprising:
- a power supply element;
- a loop element that generates a magnetic current vector having a component perpendicular to a loop plane; and
- a linear element that generates an electric current vector having a component parallel to the magnetic current vector,
- wherein a sum of electric lengths of conductors constituting the loop element and the linear element is half or less of a wavelength of a driving electromagnetic wave, and
- wherein
  - the loop element includes a first loop portion having a gap and a second loop portion having a gap, loop planes of the respective loop portions are arranged to face each other,
  - the linear element includes a straight-line-shaped linear portion,
  - one end of the linear portion is connected to the first loop portion, and the other end different from the one end of the linear portion is connected to the second loop portion, and
  - the power supply element is arranged at a point on the linear element between the first and second loop portions.

13. A communication apparatus comprising an antenna according to claim 12.

14. An antenna for receiving signals, the antenna comprising:
- a power supply element;
- a loop element that generates a magnetic current vector having a component perpendicular to a loop plane;
- a linear element that generates an electric current vector having a component parallel to the magnetic current vector;
- a cubic dielectric body having at least two opposed surfaces; and
- a GND electrode provided above one of the surfaces of the dielectric body, wherein
- a sum of electric lengths of conductors constituting the loop element and the linear element is half or less of a wavelength of a driving electromagnetic wave, the loop element includes a first electrode provided above the other of the surfaces of the cubic dielectric body, the linear element includes a second electrode that is perpendicular to a loop plane of the loop element to connect the first electrode and the GND electrode, and the power supply element arranged at a distal end of the linear element away from the loop element.

15. The antenna according to claim 14, wherein the second electrode is provided above a dielectric body surface continuous with the two surfaces of the dielectric body.

16. The antenna according to claim 15, further comprising a tap provided from the first electrode or the second electrode.

17. A communication apparatus comprising an antenna according to claim 16.

18. A communication apparatus comprising an antenna according to claim 15.

19. A communication apparatus comprising an antenna according to claim 14.

* * * * *